United States Patent [19]

Long et al.

[11] Patent Number: 4,870,946
[45] Date of Patent: Oct. 3, 1989

[54] FLUID-COOLED APPARATUS FOR CUTTING CONCRETE MATERIAL AND THE LIKE

[75] Inventors: Richard D. Long, Santa Clara; David L. Long, San Jose; Clifford D. Long, San Jose; Kenneth E. Clark, San Jose, all of Calif.

[73] Assignee: Longco, Inc., Santa Clara, Calif.

[21] Appl. No.: 46,730

[22] Filed: May 7, 1987

[51] Int. Cl.$^4$ .............................................. B28D 1/04
[52] U.S. Cl. .................................. 125/13 R; 51/267; 83/169; 83/171; 30/123.3
[58] Field of Search ......................... 125/13 R, 13 SS; 51/266, 267, 168; 83/169, 171; 30/123.3

[56] References Cited

U.S. PATENT DOCUMENTS

| | | | |
|---|---|---|---|
| 1,888,895 | 11/1932 | Verkuil | 125/13 R |
| 2,372,699 | 4/1945 | Wiken et al. | 83/169 X |
| 2,378,070 | 6/1945 | Eastwood | 51/267 |
| 2,819,568 | 1/1958 | Kasick | 51/266 X |
| 3,483,858 | 12/1969 | Jansen | 125/13 R |
| 3,739,535 | 6/1973 | Fournier | 51/266 X |
| 3,896,783 | 7/1975 | Manning | 125/13 R |
| 4,240,230 | 12/1980 | Ferrantini | 51/168 |
| 4,322,920 | 4/1982 | Wells | 51/168 |
| 4,393,626 | 7/1983 | Schroer | 51/168 |
| 4,507,897 | 4/1985 | Vieau et al. | 51/168 X |
| 4,570,609 | 2/1986 | Hogue | 125/13 R |
| 4,691,685 | 9/1987 | Dempsey | 51/168 X |

FOREIGN PATENT DOCUMENTS

| | | | |
|---|---|---|---|
| 0050233 | 4/1982 | European Pat. Off. | 51/267 |
| 0141130 | 4/1980 | German Democratic Rep. | 51/267 |
| 0618154 | 2/1961 | Italy | 125/13 R |
| 1237402 | 6/1986 | U.S.S.R. | 51/267 |
| 0576794 | 4/1946 | United Kingdom | 125/15 |
| 0832112 | 4/1960 | United Kingdom | 125/13 R |

*Primary Examiner*—Frederick R. Schmidt
*Assistant Examiner*—Shirish Desai
*Attorney, Agent, or Firm*—Rosenblum, Parish & Bacigalupi

[57] ABSTRACT

The present invention includes a reversible concrete cutting saw blade and one or two blade attachment plates having radial grooves formed in the blade engaging faces thereof, such that when the plates and blades are joined, radial passageways are formed between the plates and the blade. An inlet tube, communicating with a rotatable inner hub introduces cooling fluid into internal passage ways within the hub under positive flow conditions, thereby causing the fluid to flow through the hub to the radial passageways in the plates and then be centrifugally dispersed down the grooves along the surfaces of the blade.

5 Claims, 4 Drawing Sheets

FLUID-COOLED APPARATUS FOR CUTTING CONCRETE MATERIAL AND THE LIKE

BACKGROUND OF THE INVENTION

I. Field of the Invention.

This invention relates generally to an improved apparatus for cutting concrete materials and the like and more particularly, to a circular concrete cutting saw in which a fluid, such as water, is used to cool both sides of the saw blade.

II. Brief Description of the Prior Art.

Fluid-cooled circular saws used for cutting materials such as wood, or even concrete, have been in existence for a number of years. An excellent description of the various types of devices that have been developed can be found in Hogue, U.S. Pat. No. 4,570,609, issued Feb. 18, 1986.

In general, the basic device consists of a large disc-shaped cutting blade which is attached to a hub on one side of the blade and then affixed to a rotatable shaft powered by a motor. When the shaft is rotated, the blade spins in a circular fashion and teeth on the blade gouge into the surface to be cut, thereby forming a cut line in the surface of the concrete. When materials such as concrete are cut, diamond-impregnated steel is used on the cutting tips, or teeth, of the saw to assure that the blades do not wear as easily as less hardened materials, and to provide a cleaner cut.

The diamond-impregnated cutting teeth of the blade are usually attached to the circular saw plate by either soldering or an adhesive material. When the blades are rotating at high speeds and are cutting into hardened materials, the blade and attached hub will get hot enough to break down the adhesive or solder joint. In addition, if the blade or hub is allowed to get too hot, stress fractures in the metal will occur. Regardless of whether only the teeth become detached from the blade, or the blade or hub is also fractured, hardened pieces of metal can be driven away from the saw at speeds approaching that of a bullet. Rough metal traveling at such great speeds can easily pierce protective guard housing surrounding the blade and cause injury to the operator as well as cause great damage to the equipment. In addition, excessive heat prematurely ages the life of the blade. Thus, unless both the hub and both sides of the saw blade (including the teeth) are sufficiently cooled, various parts will have to be continuously replaced, which results in high operating costs.

Prior art devices such as Hogue or Manning, U.S. Pat. No. 3,896,783, issued July 29, 1975, have attempted to water-cool the blade and hub in a variety of ways. In Manning, a tube is attached to an inlet device affixed to the top of the blade guard, which has a number of thinner tubes that run along its inside walls. When water is introduced into the system, small openings in the thin internal tubes of the guard cause fluid to spray on the sides of the blade. However, when cooling fluid is sprayed on the blades, only exposed portions of the blade can be cooled, thus, the area between where the hub and blade contact and the cutting area may not be sufficiently cooled. In Hogue, tubes mounted on the guard also spray fluid onto the outer surface of the blade, as well as spray fluid into a doughnut-shaped annular groove in the hub, from which the spinning motion of the hub centrifugally disperses the fluid through small passageways running perpendicular to the surface of the blade (or parallel to the shaft) and through the hub to the external side of the blade. The inadequacies of this method of fluid-cooling will be discussed below.

Aside from the prior art's limited ability to disperse cooling fluid to needed areas of the saw, neither Hogue nor Manning adequately take into consideration the working environment in which such saws are used. In use, the saws tend to be handled roughly, such as dropped or thrown in the back of trucks, which often results in damage to the blade guard. In addition, if a particular cut is not made correctly, the blade of the saw can be pushed into the guard protecting the blade, which results in damage to the guard and cooling tubes, as well as the blade.

Hogue teaches that for flush cut applications fluid can be introduced into the hub area and then delivered by centrifugal force to the distal end of the hub for dispersal to the outer surface of the blade. However, the method taught by Hogue is far from effective. As fluid is sprayed into the rearwardly opening, doughnut-shaped annular groove in the hub, centrifugal force is relied on to push the fluid collecting in the groove through openings in the hub to the external side of the blade. While some fluid inevitably travels to the external surface of the blade, some fluid will also escape through the rearward opening of the groove and therefore have absolutely no effect in cooling the blade. In addition, because the fluid in the groove is not under positive pressurized flow, only centrifugal forces will cause the fluid to flow down this passageway in the hub. In Hogue, the passageways between the rear groove and the outlets on the opposite side of the blade appear to be parallel to the shaft. Centrifugal force on fluid in this passageway would be perpendicular to the rotational direction of the shaft, not parallel, thus the fluid is not actually forced to flow down the shaft and may even stop flowing along the passageways in some situations.

Due to the limited cooling feature of prior art flush cutting saws, one person has been required to operate the saw while a second person either squeegeed or hosed water into the cutting area so that the saw could be sufficiently cooled. In addition, the extra tubing and enlarged guard required by the prior art saws adds a significant amount of weight to the saw, further restricting its operation as well as its portability.

When prior art saws are used for flush cutting (such as cutting a groove in the floor along a wall), one side of the blade wears substantially faster than the opposite side of the blade. While the exaggerated wear is, in part, due to insufficient cooling, it is accented by the fact that the construction of the hubs, blades and cooling tubes are such that the blades can not be reversed so as to extend the life-span of the blades. Because a truly reversible saw blade would require twice the number of holes as a one-sided blade, and would be further weakened and prone to stress-fracturing than a one-sided blade, it is important that the cooling system of a reversible blade saw be better than that of nonreversible saws. Thus if the saw has an improved, highly efficient cooling system in accordance with the present invention, the additional holes necessary for a reversible blade can be added without reducing the strength of the blade or increasing the likelihood of stress fracturing.

An additional limitation of prior art saws is that a different hub is required when the saw is used for flush-cut operation than when the saw is used for open-cut operation. The removal and replacement of one hub with different hubs results in increased labor, additional tooling and other extra costs.

SUMMARY OF THE INVENTION

An object of the present invention is to provide an improved fluid-cooled concrete cutting saw in which the coolant used to cool the blade and hub is directly applied thereto.

Another object of the present invention is to provide a concrete cutting saw in which no spray tubing is attached to the protective guard of the saw.

Another object of the present invention is to provide a concrete cutting saw in which the saw can be converted from a flush-cutting saw to an open-cutting saw with a minimum amount of effort.

A further object of the present invention is to provide a saw of the type described wherein the saw blade is easily reversible on the hub thereby extending the useful life of the blade.

Still a further object of the present invention is to provide an improved circular cutting saw in which the weight of the saw is significantly reduced, therefore improving the ease of operation and portability.

Briefly, a preferred embodiment of the present invention includes a reversible concrete cutting saw blade and one or two blade attachment plates having radial grooves formed in the blade engaging faces thereof, such that when the plates and blade are joined, radial passageways are formed between the plates and the blade. An inlet tube, communicating with a rotatable inner hub introduces cooling fluid into internal passageways within the hub under positive flow conditions, thereby causing the fluid to flow through the hub to the radial passageways in the plates and then be centrifugally dispersed down the grooves along the surfaces of the blade. The saw may be configured to operate with a single internal plate for flush-cut operation or with both internal and external plates for open-cut operation.

Other objects and advantages of the present invention will be evident from the following detailed description when read in conjunction with the accompanying drawing which illustrates one preferred embodiment of the present invention.

DESCRIPTION OF THE PREFERRED EMBODIMENT

Figure 1:
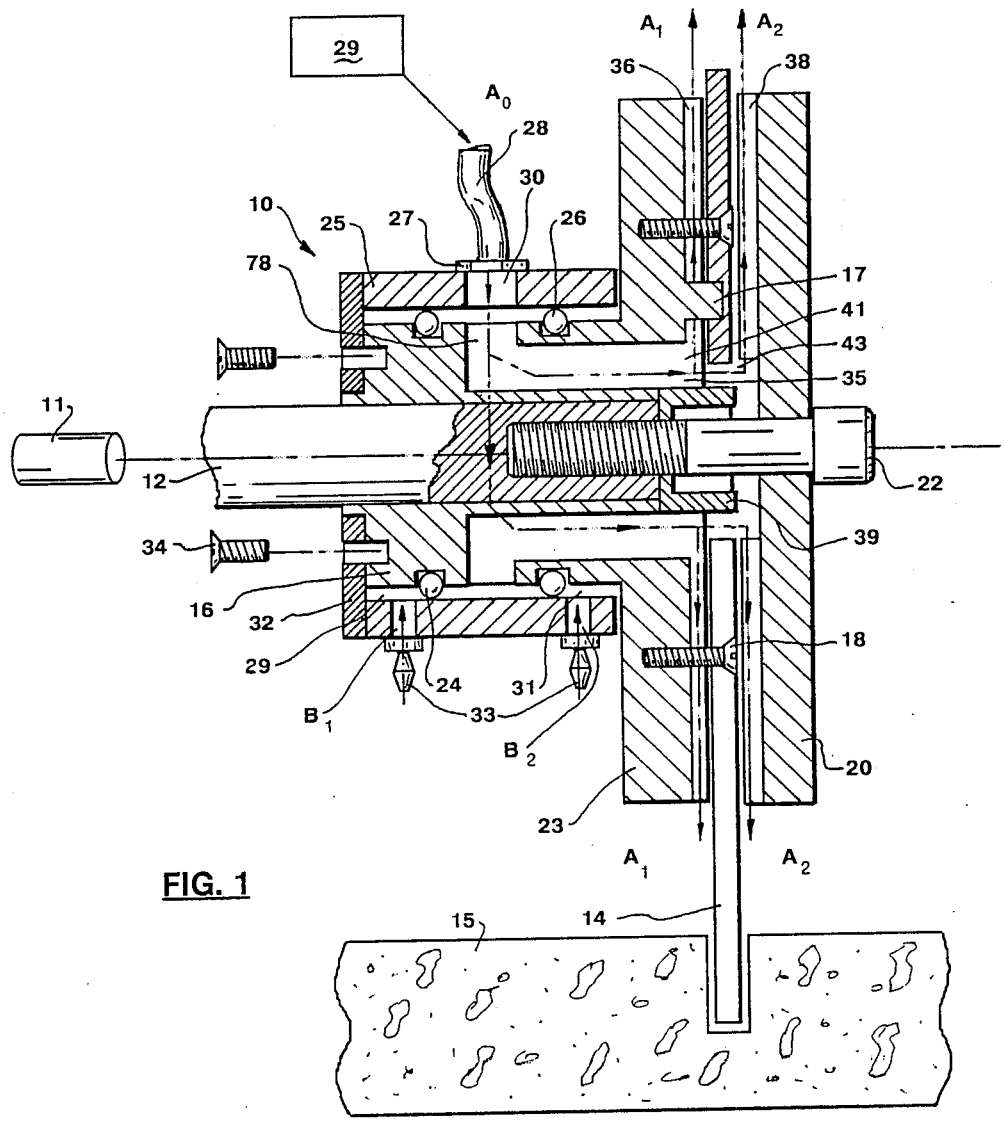
FIG. 1 is a partially broken, axial cross-sectional view depicting the hub and blade portion of the preferred embodiment configured for open-cutting.

In reference to the drawing, and in particular to FIG. 1, a partially broken, axial cross-sectional view of a circular saw in accordance with the present invention is shown wherein the hub assembly 10 is mounted on and about a shaft 12, one end of which is inserted into a central aperture created in the hub assembly 10. The longitudinal axis of shaft 12 defines a rotational axis about which the diamond-saw blade 14, shown cutting into concrete 15, is to be rotated. In particular, saw blade 14 is affixed to an inner plate 23, forming a part of the inner hub 16, by means of the screws 18 when the same is used in a flush cutting configuration, or by an elongated center screw 22 and outer plate 20 when used in an open cutting configuration. A drive pin 17 is used to provide positive drive between hub and blade.

The blade sides of the inner plate 23 and the outer plate 20 have radial grooves or slots 36 and 38, respectively, which segment the surface of the plates in a pie-like fashion. When saw blade 14 is assembled with the plates, passageways are formed at the slots 36 and 38 through which coolant can flow along the radial lines beginning near the center of each plate and extending outwardly toward the perimeter of each plate.

A collar 25 is fitted over the inner hub 16 and separated therefrom by O-ring seals 24 and 26. An inlet fitting 27 affixed about an opening in collar 25 provides a means for connecting an inlet hose 28, such that coolant can flow from the coolant supply 29 along the path $A_0$ and into the fluid inlet cavity 30. By directly connecting the inlet hose 28 to the collar 25, coolant can be introduced to the hub assembly under positive pressure. The inlet hose 28 is routed away from the saw blade so as to avoid damage when the saw is in use. One way fittings 33 are attached to the collar 25, such that grease or other lubricants can be applied to the seals 24 and 26 and the rubbing surfaces at 29 and 31. This feature also provides a means for purging any coolant that might be trapped in the lubricating cavity and cause rust to form during periods of non-use.

The hub assembly 10 is closed at the shaft end by means of a washer 32 which is affixed to inner hub 16 by means of screws 34 and fitted tightly against collar 23 to prevent the introduction to contaminants into the hub assembly 10.

An arbor 39 at the blade-end of hub 16 centers the blade 14 on the hub assembly 10. The arbor is formed by a raised circular portion which extends out past the face of the inner plate 23 and is inserted into the center hole of the blade 14.

In operation, the apparatus is powered by means of a motor 11. Coolant flows from coolant supply 29 by means of tube 28 along path $A_0$ into the inlet port 30 of the collar 25 under positive pressure. The pressurized coolant flows from inlet port 30 into the annular groove 78 (FIG. 5) of the inner hub and through passageways 35 formed in both hub 16 and arbor 39 to the outlet openings 41 formed in hub 16 and 43 formed in the perimeter of arbor 39. Coolant reaching the outlet openings 41 will flow along path $A_1$ of FIGS. 1 and 2 to cool and lubricate the inner side of blade 14, and that reaching the openings 43 will flow along the paths $A_2$ (FIG. 1), between the blade and the outer plate 20, or along the path $A_3$ (FIG. 2), between the blade and wall 40, as would be the case when the apparatus is used for flush cutting.

As opposed to prior art devices, positive pressure on the coolant entering the passageways inside the hub assembly is used to propel coolant along the paths parallel to the shaft and centrifugal force is relied upon to distribute the coolant over the blade surfaces. Coolant is not only in contact with the blade surfaces in the areas between the plates and blade, areas uncooled in prior art devices, but is also kept in contact with the cutting portions of the blade surfaces as it is thrown outwardly toward the blade circumference by centrifugal force. In effect, the coolant will plane along the surface of the blade to the saw teeth. This is in contrast to that of prior art devices wherein coolant is sprayed on the blade surfaces and in large part is deflected from the blade surface or shielded therefrom by the film of air that attaches to the surface of the blade when rotating at high speeds.

It should be noted that when outer plate 20 is affixed to hub assembly 10, and the device is used for open-cutting, such as shown in FIG. 1, there is no need for the screws 18 to affix the saw blade 14 to inner plate 16 because elongated screw 22 is sufficient to hold the entire assembly together. An additional advantage is provided in that the outer plate may be quickly removed to replace the blade by simply removing screw 22.

Figure 2:
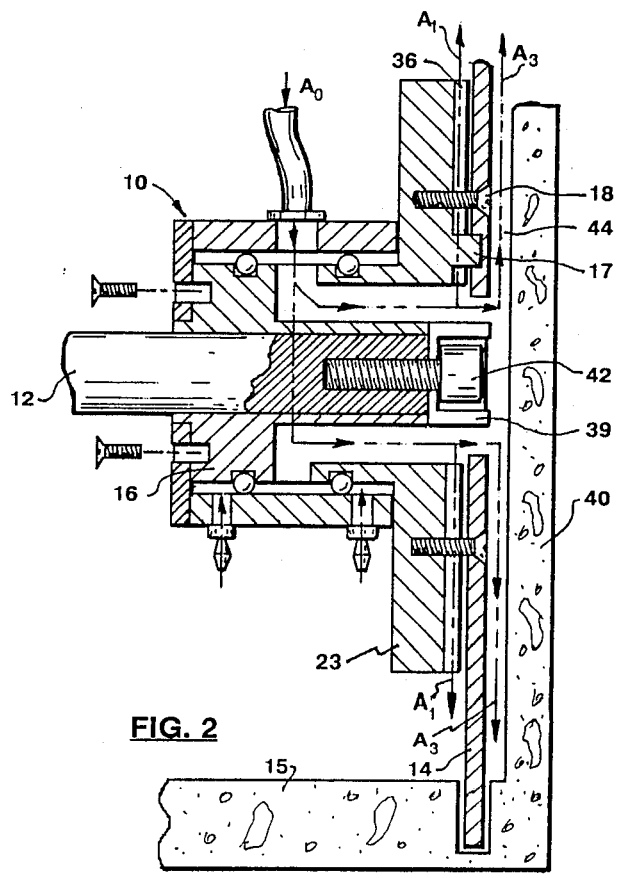
FIG. 2 is a partially broken, axial cross-sectional view of the preferred embodiment configured for flush-cutting.

As shown in FIG. 2, when the hub assembly 10 is configured for flush-cutting the elongated screw 22 is replaced by a shorter screw 42, and screws 18 are used to affix the saw blade 14 to the inner plate 16. The screw 42 functions to affix the hub assembly to shaft 12.

Figures 3A, 3B:
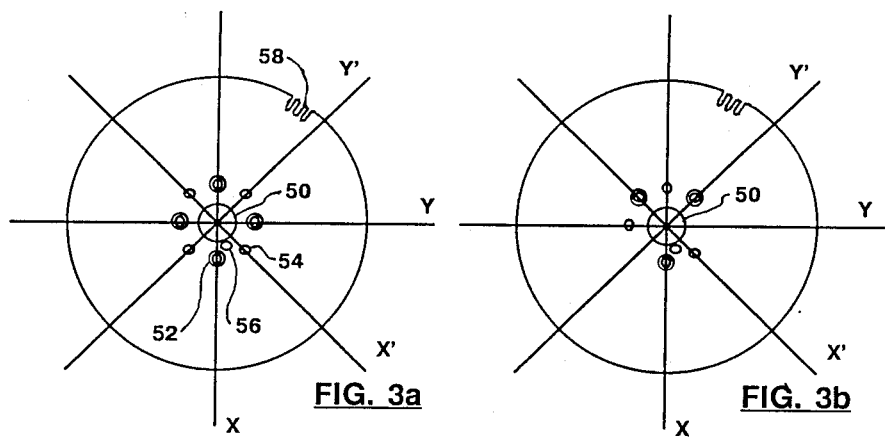
FIGS. 3a and 3b are respectively, elevational views of four-hole and three-hole reversible saw blades.

Referring now to FIGS. 3a and 3b, there are shown two embodiments of the reversible saw blade. FIG. 3a shows a center hole 50, and four countersunk holes 52 situated on the perpendicular axes X and Y about center hole 50. The purpose of the countersinking is to provide recesses for receiving the heads of screws 18. When the blade is flipped over, it will be appreciated that engagement of drive pin 17, with opening 56, will cause the screw holes in plate 23 to be misaligned with the holes 52. Accordingly, four additional holes 54 are disposed along the axis X' and Y' and are countersunk on the opposite side of the blade. FIG. 3b depicts a similar orientation of position holes and drive pin hole around a center hole 50 with a three-hole configuration used instead of four.

Figure 4:
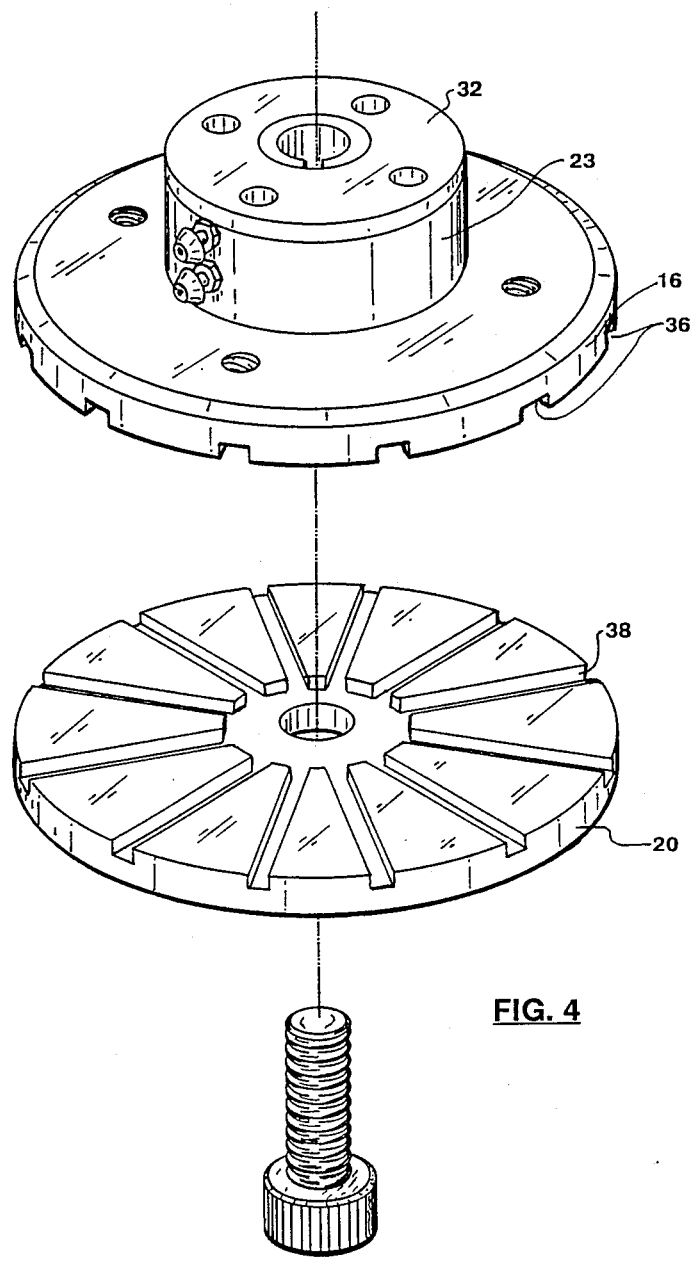
FIG. 4 is an exploded perspective view of the hub, inner plate and outer plate without the blade shown between the two plates.

An exploded view showing surface details of the hub and the inner and outer plates is depicted in FIG. 4. On the inner side of the outer plate 20, which engages one side of a saw blade, are a number of slots 38 which form passageways when the plate 20 is placed against a saw blade. A similar number of slots or channels are located on the blade facing surface of inner plate 16.

Figure 5:
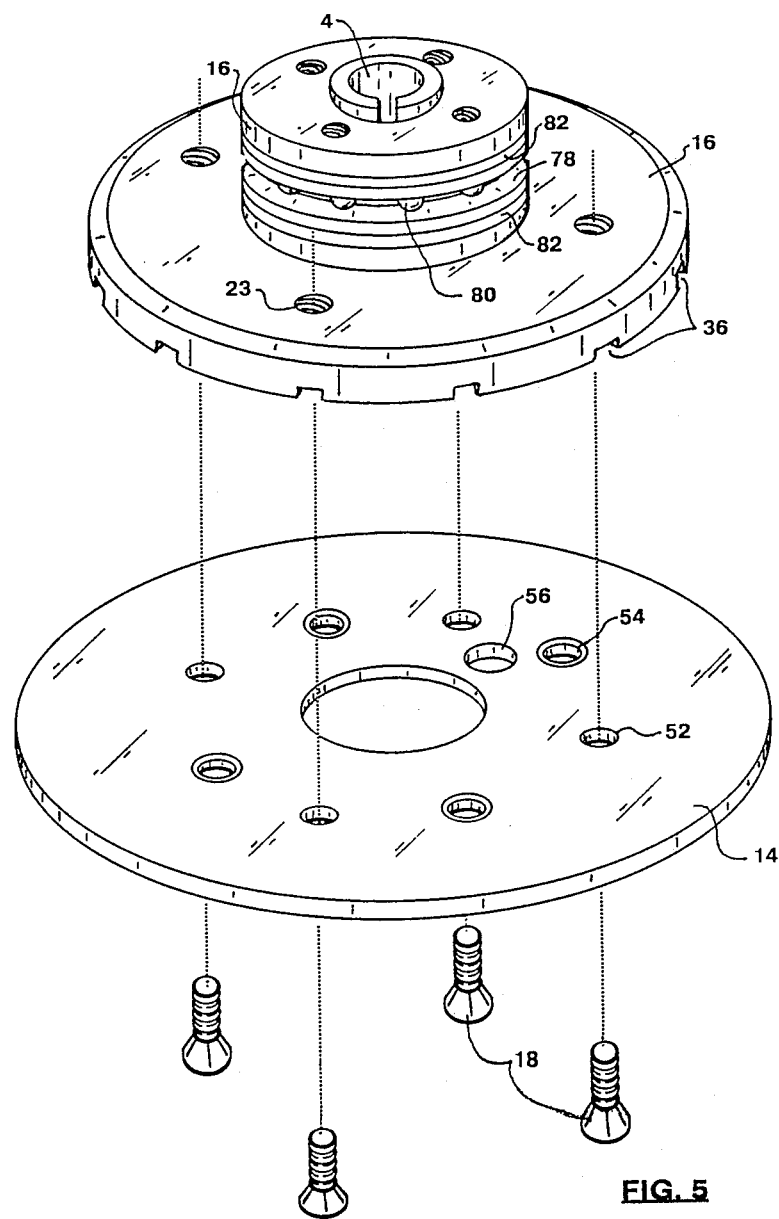
FIG. 5 is an exploded perspective view of the inner hub without the collar and further illustrating the reversible nature of the saw blade.

FIG. 5 depicts the inner hub 16, inner plate 23 and saw blade 14 shown without the collar 24. Mounting holes 52 are shown as non-countersunk on the inside face while holes 54 are shown countersunk on this face. Once again, it will be noted that drive pin hole 56 will have the same positional relationship to an adjacent countersunk hole on each side.

Additionally, FIG. 5 further illustrates details of the inner hub 16 and in particular the annular groove 78 and its relationship to the two O-ring seal grooves 82 and the bore holes 80 which form the passageways 35. Coolant passing through the inlet tube 28 (FIG. 1), passes through the inlet opening, into the groove 78 and into the inner hub assembly, whereupon it is forced to the radially extending grooves 36 (and 38 of FIG. 4) or against the wall 40 (FIG. 2).

Although the present invention has been described above relative to a circular, concrete cutting saw, it is to be understood that the invention can also be applied to any of a number of rotatable devices which may be cooled by means of a fluid coolant, such as a lathe or drill. It is anticipated that other embodiments and/or alterations or modifications thereof will become apparent to those skilled in the art after reading this disclosure. Accordingly, it is intended that the following claims be interpreted to cover all such alternatives, alterations or modifications as fall within the true spirit and scope of the invention.

We claim:

1. An improve hub assembly for coupling a saw blade having a predetermined array of openings formed therein to a motor driven shaft and applying coolant to both sides of the blade, said array of openings including a central opening, a drive pin opening, and a plurality of screw openings, comprising:

a cylindrical, rotatable hub having a central bore extending into one end thereof for receiving an end of the drive shaft, said hub further having coolant inlet openings, an arbor at the opposite end of said hub for mating with the central opening in the blade and having coolant discharge openings for discharging coolant to both sides of the blade, means forming at least one passageway in said hub for connecting said inlet openings and said discharge openings, and a blade engaging flange disposed at said opposite end of said hub and including a plurality of threaded bores formed therein, said flange further including a drive pin extending from said flange for mating with said drive pin opening to driveably engage said blade, said drive pin having a predetermined relationship to said threaded bores such that when said drive pin is in engagement with said drive pin opening, a screw opening is in alignment with each of said threaded bores;

a fixed outer sleeve surrounding a portion of said hub and having an inlet port disposed in communicating relationship with said inlet openings of said hub;

sealing means disposed on opposite sides of said inlet openings and said inlet port for providing seals between said fixed sleeve and said hub and restricting the flow of coolant from said inlet port to said inlet openings; and fastening means including a plurality of screws for passage through said screw openings in said blade and for engaging said threaded bores to secure said blade and hub to said shaft, whereby coolant entering said inlet port under pressure flows into said inlet openings, along said passageway and out said discharge openings to cool both sides of the blade.

2. An improved hub assembly as recited in claim 1 wherein said inlet opening is an annular groove formed in the circumference of said hub.

3. An improved hub assembly as recited in claim 1 wherein said passageway is formed by a plurality of bores extending into said opposite end of said hub and parallel to the axis thereof.

4. An improved hub assembly as recited in claim 1 wherein said fastening means further includes a circular plate for engaging the outer surface of the blade and clamping it against said hub, and a bolt for extending through a central aperture in said plate for engaging a threaded axial opening in the end of said shaft, said plate having a central recess for communicating with said discharge opening and at least one outwardly extending groove in the blade engaging face of said plate for directing coolant to the circumference of said plate.

5. An improved hub assembly as recited in claim 4 wherein said groove in said plate extends radially to the circumference of said plate.

* * * * *